United States Patent [19]

Baur et al.

[11] 4,240,711

[45] Dec. 23, 1980

[54] DISPLAY DEVICE COMPRISING A LIQUID CRYSTAL CELL WITH LIGHT VALVES

[75] Inventors: Günter Baur, Freiburg; Waldemar Greubel; Hans Krüger, both of Munich; Alois Schauer, Gruenwald, all of Fed. Rep. of Germany

[73] Assignee: Siemens Aktiengesellschaft, Berlin & Munich, Fed. Rep. of Germany

[21] Appl. No.: 877,366

[22] Filed: Feb. 13, 1978

[30] Foreign Application Priority Data

Feb. 15, 1977 [DE] Fed. Rep. of Germany ....... 2706355

[51] Int. Cl.³ .............................................. G02F 1/133
[52] U.S. Cl. .................................... 350/345; 350/349; 350/339 D
[58] Field of Search ..................... 350/345, 349, 339 D

[56] References Cited

U.S. PATENT DOCUMENTS

| | | | |
|---|---|---|---|
| 3,551,026 | 12/1970 | Heilmeier | 350/349 |
| 4,017,155 | 4/1977 | Yagi et al. | 350/345 |
| 4,043,636 | 8/1977 | Eberhardt et al. | 350/345 |
| 4,088,992 | 5/1978 | Kmetz et al. | 350/345 X |
| 4,142,781 | 3/1979 | Baur et al. | 350/345 |

FOREIGN PATENT DOCUMENTS 2158563 6/1972 Fed. Rep. of Germany .
2554226 6/1977 Fed. Rep. of Germany .
2619368 11/1977 Fed. Rep. of Germany .
1372868 11/1974 United Kingdom .

Primary Examiner—Edward S. Bauer
Attorney, Agent, or Firm—Hill, Van Santen, Steadman, Chiara & Simpson

[57] ABSTRACT

A display device having a liquid crystal cell containing a medium, which can be switched zone-wise between at least two different optical states to form a light valve, a light trap in the form of a plate-shaped body disposed behind the liquid crystal cell when taken in a direction of observation of the device, the plate-shaped body having a material with an index of refraction greater than 1, containing fluorescent particles, and possessing a light emergent or outlet window at the rear of each switchable zone of the liquid crystal cell characterized by the light emergent or outlet windows comprising a groove in the plate and a light scattering surface disposed between the groove and the medium of the liquid crystal cell. Preferably, the grooves of each of the windows is disposed in a rear surface or side of the fluorescent plate and the scattering surface is arranged on a front surface of the plate and can either be formed by a pigment layer which has been silk screened on the front surface or a rough surface zone which has been embossed on the front surface.

5 Claims, 2 Drawing Figures

DISPLAY DEVICE COMPRISING A LIQUID CRYSTAL CELL WITH LIGHT VALVES

BACKGROUND OF THE INVENTION

The present invention is directed to a display device having at least one light valve in particular a liquid crystal cell containing a medium which can be switched zone-wise between at least two different optical states, a light trap in the form of a plate-shaped body disposed behind the liquid crystal cell when taken in the direction of observation of the device, the body having the index of refraction greater than 1, containing fluorescent particles, and possessing outlet windows behind every switchable zone of the medium.

Display devices, which have a liquid crystal cell, and fluorescent plate, which has exit windows or emergent windows, have been described in German Offenlegungsschrift No. 26 19 368, and in U.S. Pat. application Ser. No. 747,035, issued as U.S. Pat. No. 4,142,781 and which includes the disclosure of German application No. P 25 54 226. In these devices, a fluorescent plate, which increases the representational contrast by means of fluorescent scattering and subsequent total reflection, intercepts a major part of the incoming surrounding or ambient light and passes this light finally through special light outlet windows or emergent windows with a relative high intensity.

In accordance with these previous disclosures, the outlet windows are to be constructed mainly by means of scattering pigment layers on a rear surface of the fluorescent plate or by grooves which are placed on either the rear or front surface of the plate, see U.S. Ser. No. 747,035.

SUMMARY OF THE INVENTION

The present invention is directed to an improved structure of the emergent or exit windows which enables a particularly good display quality to be achieved. In particular, the windows will provide a large observation angle without a loss of brightness and furthermore, give the least possible rise of parallax errors.

To achieve these tasks, the present invention is an improvement in a display device having at least one light valve, said device comprising the liquid crystal cell containing a medium which can be switched zone-wise between at least two different optical states, a light trap in the form of a plate-shaped body disposed behind the liquid crystal cell when taken in a direction of observation of the device, said plate-shaped body consisting of a material having an index of refraction greater than 1 and containing fluorescent particles, said body possessing a light emergent or exit window at the rear of each switchable zone of the liquid crystal cell. The improvements comprise each of the light emergent windows comprising a groove in the plate and a light scattering surface, said light scattering surface being disposed between the medium of the liquid crystal and the groove and in front of the fluorscent plate when taken in the direction of observation. Preferably, the grooves are formed into the rear surface of the fluorescent plate and the scattering surfaces are positioned on the front surface of the plate. The scattering surface can be a pigment layer which is preferably applied by a silk screen printing or a rough surface zone, which is formed on the front surface of the fluorescent plate as an embossment.

The proposed improvement of the device provides a scattering plane closely behind the switchable medium of the light valve or liquid crystal cell. With this type of geometrical arrangement, a major part of the scattered radiation reaches the associated display element and if this element is in a light permeable state can be emitted from the light valve in a wide spatial angle range. The display is also virtually parallax-free even when considered from extremely oblique directions. The particular advantage consists in the fact that by suitable formation of the groove and/or the scattering surface, it is possible to vary the most important parameters of the output-coupled radiation such as the intensity or spatial angle distribution or other properties such as color and, thus, to optimally match these properties to a particular purpose or usage. On account of the overall high light yield, the display will possess a high luminosity.

If the light valve consists of a liquid crystal cell which operates with polarization of light, a very short distance is achieved between the scattered surface and the liquid crystal layer, if at least one pleochroic dye is added to the liquid crystal substance. In this case, no polarizer is required between the layer of the cell and the fluorescent plate. Additional details of this type of arrangement can be obtained from our co-pending patent application U.S. Ser. No. 877,461 filed Feb. 13, 1978.

If provisions are additionally made to increase the representation contrast, the read-out angle range will increase. Here it has proved particularly expedient to use a light valve which is light permeable in the rest state and is light blocking in the "on" or activated state and to operate this valve in such a manner that the individual display elements are activated only when they belong to the background of the image. Such a type of operation is known as a complementary drive operation. Since the fluorescent plate in this type of device can also receive light through its front surface, which is covered by the light valve, this combination of features produces a very bright image on a dark background. Further details concerning production, operation and mode of functioning of such a device can be obtained from our co-pending U.S. Pat. application Ser. No. 877,486 filed Feb. 13, 1978.

DESCRIPTION OF THE PREFERRED EMBODIMENTS

Figure 1:
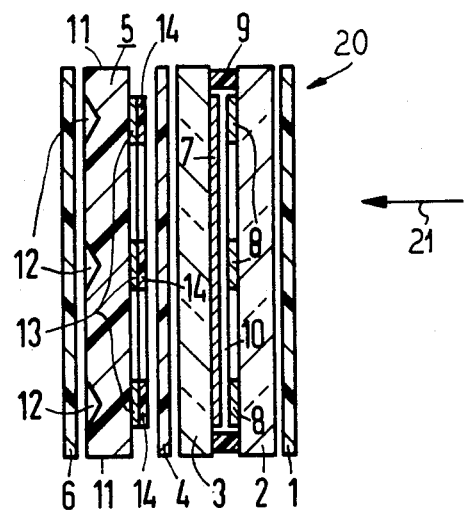
FIG. 1 is a cross-sectional view of a display device in accordance with the present invention.

The principles of the present invention are particularly useful when incorporated in a display device generally indicated at 20 which is an exemplary embodiment. The display device 20 has a one-digit display and operates in accordance with the principles of the so-called twisted cell. When taking in the direction of observation indicated by the arrow 21, the device 20 has a front linear polarizer 1, a front carrier plate 2, a rear carrier plate 3, a rear linear polarizer 4, a fluorescent plate 5 and an absorption foil 6.

The two carrier plates 2 and 3 are provided on their inner surfaces, which face towards one another with transparent conductive coatings. The rear plate 3 has a transparent rear continuous electrode 7 and the front plate 2 bears a segmented front electrode 8. A spacing frame 9 is arranged between the two plates 2 and 3 and forms a chamber which receives a liquid crystal layer 10. The molecules of the liquid crystal possess a dielectric contstant with a positive anisotropy and are oriented to be parallel with the surface of the plates 2 and 3 with the molecules adjacent one plate such as the front plate 2 extending in a direction 90° to the molecules which are adjacent the rear plate 3. Thus, a polarized light passing through the polarizer 1 will have its direction of polarization rotated by 90° to enable it to pass through the polarizer 4 which is arranged as a cross polarizer. A discussion of such a twisted cell is contained in British Pat. No. 1,372,868 which corresponds to the German Offenlegungsschrift No. 21 58 563.

The four side surfaces of the fluorescent plate 5 are provided with a reflective coating 11. The plate 5 is provided with an exit or emergent window for each of the segments of the electrode 8. Each window, which is aligned with its respective segment of the electrode 8, includes a groove 12 on the rear surface of the plate 5 and, a light scattering surface on the front surface of the plate 5. Each of the scattering surfaces in the embodiment of the device 20 is formed by a pigment layer 13 which is coated by a tritium lacquer 14, which is a β-emitter. Each of the pigment layers 13 consist of a luminous substance which can be excited by the emissions of the β-emitter, which acts as an additional illumination means. Additional illumination means utilizing a radioactive substance are described in greater detail in our co-pending U.S. Pat. application Ser. No. 877,367 filed Feb. 13, 1978 and now abandoned.

Figure 2:
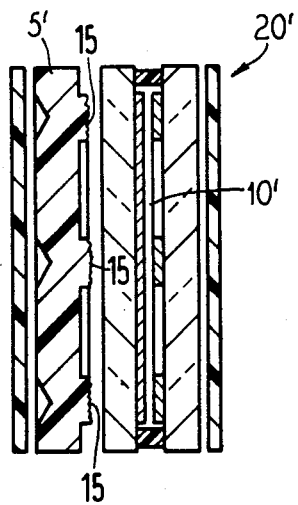
FIG. 2 is a cross-sectional view of an embodiment of the display device in accordance with the present invention.

In FIG. 2, an embodiment of the display device is generally indicated at 20'. The embodiment 20' differs from the embodiment of 20 in FIG. 1 in the following manner. The light scattering surfaces are not a special layer but are produced by an embossment 15 which is provided in the front surface of the plate 5'. In addition, the tritium film 14 and the rear linear polarizer 4 are not provided. In place of the rear polarizer 4, the liquid crystal layer 10' contains a pleochroic dye. The dye molecules absorb light with an oscillation plane parallel to the molecule axis and allow light oscillating in a direction at right angles to the axis to pass through the cells virtually unobstructed. The dye is selected to be such that the spectral range of the light emitted by the fluorescent particles and the light absorbed by the dye molecules fundamentally conform with one another. The liquid crystal molecules are oriented to be uniformly homogeneous in the rest or inoperative state and, in fact, with the preferred direction which is parallel to the direction of polarization of the linear polarizer 1. When in the activated state, the layer will assume a homeotropic texture.

The observation angle is dependent upon the formation of the grooves, for example, the opening angle and depth, and the layer thickness and width of the scattering surface and in accordance with the shape of the segment electrodes 8. Also, the observation angle range will be dependent upon the distance between the controllable medium 10 or 10' and the scattering surfaces 13 or 15. Finally, the observation angle is also dependent upon the angle-dependent contrast of the display. With a suitable matching of the various characteristics mentioned hereinabove, it is easily possible to achieve a limiting angle of more than 150°.

The invention is not limited to the represented designs or structure. Thus, within the scope of the present proposal, a person skilled in the art has at his disposal the plurality of structural differing possibilities of achieving the combination of a rear reflection point and a front scattering surface. If the light valve contains a polarizer at the rear of the switchable medium, it should, however, be ensured that the scattering surface is positioned at the rear of the polarizer.

Although various minor modifications may be suggested by those versed in the art, it should be understood that we wish to embody within the scope of the patent warranted hereon, all such modifications as reasonably and properly come within the scope of our contribution to the art.

We claim:

1. In a device having a light valve containing a medium which can be switched zone-wise between at least two different optical states, the zone-wise switching being between character shaped electrode segments on one surface of said medium and an electrode of the opposite surface of said medium, a light trap in the form of a plate-shaped body disposed behind the medium of the light valve when taken in the direction of observation of the device, said body consisting of a material having an index of refraction greater than 1 and containing fluorescent particles emitting a fluorescent light when exposed to an excitation light, said body possessing a light emergent window for the fluorescent light at the rear of each of the switchable zones of the light valve, the improvement comprising each of the light emergent windows comprising a groove in the rear surface of the body and a light scattering surface on the front surface of the body, said light scattering surface being restricted to the region of said front surface directly behind said character shaped electrode segment.

2. In a display device according to claim 1, wherein the light scattering surface is a silk screened pigment layer.

3. In a display device according to claim 1, wherein the light scattering surface is formed by a rough surface zone on the front surface of the fluorescent body.

4. In a display device according to claim 1, wherein the rough surface zone is an embossment.

5. In a display device according to claim 1, wherein the light valve is a liquid crystal cell having a liquid crystal layer containing at least one pleochroic dye.

* * * * *